(12) United States Patent
Li et al.

(10) Patent No.: US 7,672,121 B2
(45) Date of Patent: Mar. 2, 2010

(54) FLAT PANEL DISPLAY WITH DETACHABLE BASE

(75) Inventors: Ming-Chuan Li, Miao-Li (TW); Te-Hsu Wang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 139 days.

(21) Appl. No.: 11/974,040

(22) Filed: Oct. 11, 2007

(65) Prior Publication Data

US 2008/0089019 A1  Apr. 17, 2008

(30) Foreign Application Priority Data

Oct. 11, 2006  (TW) .............................. 95137308 A

(51) Int. Cl.
  *G06F 1/16* (2006.01)
(52) U.S. Cl. .................... 361/679.21; 248/917; 248/371
(58) Field of Classification Search ..................
  361/679.04–679.07, 679.21–679.22; 248/371, 248/917–924
See application file for complete search history.

(56) References Cited

U.S. PATENT DOCUMENTS

| | | | | |
|---|---|---|---|---|
| 5,144,290 | A  * | 9/1992 | Honda et al. ................. | 248/917 |
| 6,400,560 | B1 * | 6/2002 | Chian ..................... | 361/679.21 |
| 6,445,385 | B1 * | 9/2002 | Shin et al. .................... | 248/918 |
| 7,072,175 | B2 | 7/2006 | Ho | |
| 7,177,144 | B2 * | 2/2007 | Ha et al. ................. | 361/679.06 |
| 7,361,046 | B2 * | 4/2008 | Drew .......................... | 248/917 |
| 2003/0227739 | A1 * | 12/2003 | Kim et al. .................... | 361/681 |
| 2006/0289716 | A1 * | 12/2006 | Cai et al. .................... | 248/371 |
| 2007/0008686 | A1 * | 1/2007 | Jang ........................... | 361/681 |
| 2008/0037206 | A1 * | 2/2008 | Huang ........................ | 361/681 |

* cited by examiner

*Primary Examiner*—Lisa Lea-Edmonds
(74) *Attorney, Agent, or Firm*—Wei Te Chung

(57) ABSTRACT

An exemplary flat panel display (200) includes a display module (22), a supporting member (25) for supporting the display module, and a base (27) detachably attaching to the supporting member. The supporting member includes a first hook (254) and a positioning groove (258). The base includes an elastic member (273) and a first through slot (274). When the first hook is latched in the first through slot and part of the elastic member is received in the positioning groove, the supporting member is detachably attached to the base.

20 Claims, 4 Drawing Sheets

FLAT PANEL DISPLAY WITH DETACHABLE BASE

FIELD OF THE INVENTION

The present invention relates to display devices and supporting structures thereof, and more particularly to a flat panel display with a detachable base.

GENERAL BACKGROUND

Flat panel displays are widely used in modern display devices due to their advantages such as portability, low power consumption, and low radiation.

FIG. 6 is a rear, perspective view of a conventional flat panel display. The flat panel display 100 includes a display module 12, a supporting member 13, and a base 17. The display module 12 is pivotally attached to the supporting member 13 via an axle 127. The supporting member 13 is integrally formed with the base 17.

The combined supporting member 13 and base 17 typically occupies a large amount of space in addition to that occupied by the display module 12. Furthermore, once the flat panel display 100 is manufactured, the combined supporting member 13 and base 17 occupy the large amount of space even though they are not yet needed by the end user. Thus transportation of the flat panel display 100 from the factory to the end user is somewhat inconvenient and costly.

It is, therefore, desired to provide a flat panel display that can overcome the above-described deficiencies.

SUMMARY

In one aspect, a plat panel display includes a display module, a supporting member for supporting the display module, and a base detachably attachable to the supporting member. The supporting member includes a first hook and a positioning groove. The base includes an elastic member and a first through slot. When the first hook is latched in the first through slot and part of the elastic member is received in the positioning groove, the supporting member is detachably attached to the base.

In another aspect, a plat panel display includes a display module, a supporting member for supporting the display module, and a base detachably fastenable to the supporting member. The supporting member includes a first hook and a positioning groove. The base includes an elastic member and a first through slot. The base is detachably fastened to the supporting member by cooperation of the first hook being received in the through slot and detachably latched with the base and part of the elastic member being snappingly received in the positioning groove.

Other novel features and advantages of the above-described flat panel display will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
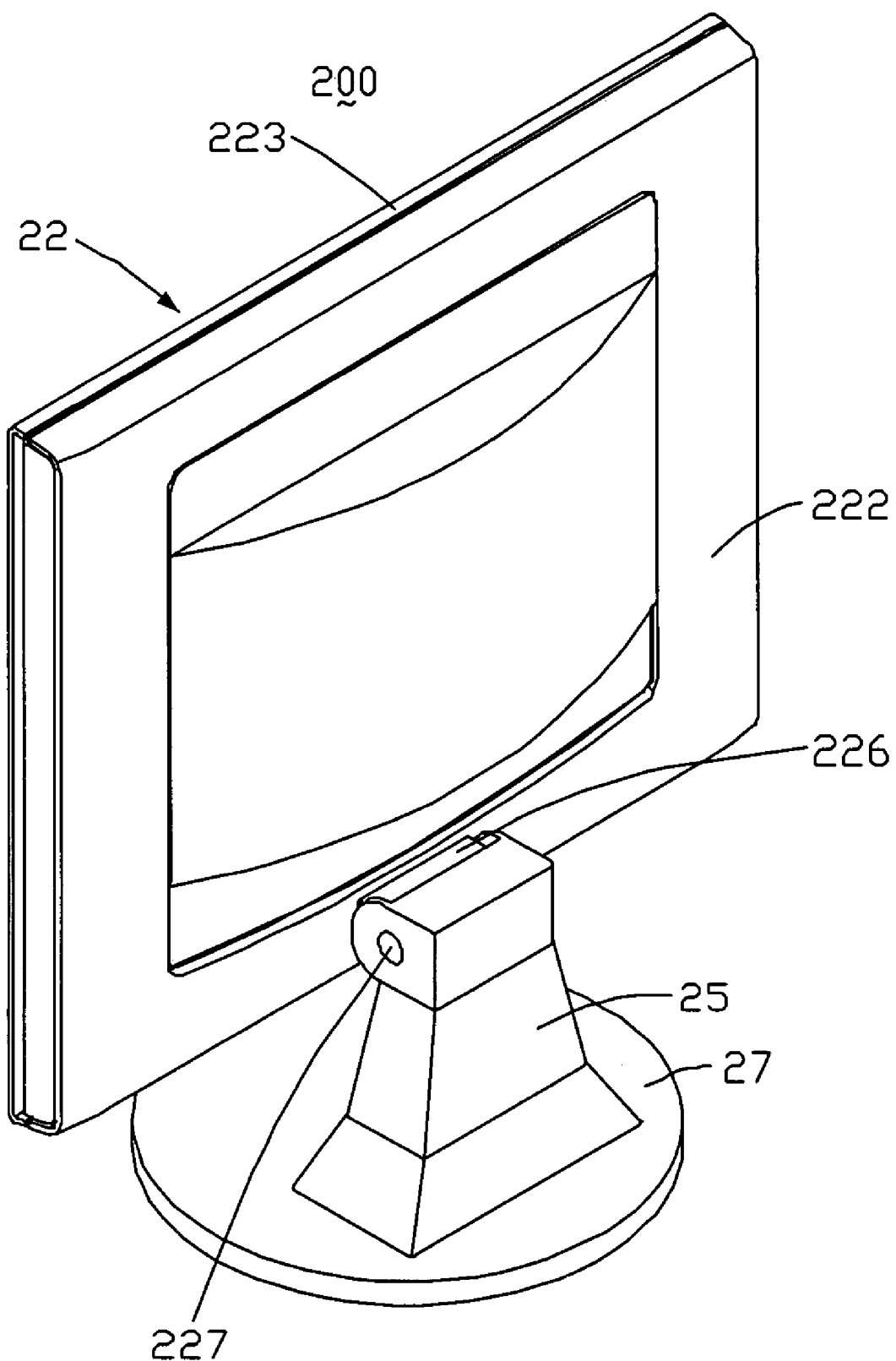
FIG. 1 is a rear, perspective view of a flat panel display according to an exemplary embodiment of the present invention, the flat panel display including a base and a supporting member.

FIG. 1 is a rear, perspective view of a flat panel display according to an exemplary embodiment of the present invention. The flat panel display 200 includes a display module 22, a supporting member 25 configured to engage with and support the display module 22, and a base 27 for holding the supporting member 25.

The display module 22 includes a front frame 223, a back shell 222 opposite to the front frame 223, and a display panel (not shown) for displaying images. The front frame 223, together with the back shell 222, forms an accommodating space for receiving the display panel. The front frame 223 surrounds a display screen (not visible) of the display panel. The back shell 222 includes an attaching portion 226 integrally formed at a bottom of a rear surface thereof. The display module 22 is pivotally attached to the supporting member 25 via an axle 227 inside the attaching portion 226, so as to enable the display module 22 to rotate on the supporting member 25. The display panel of the display module 22 can for example be one of a liquid crystal display panel, a plasma display panel, and an organic light emitting display panel.

Figure 2:
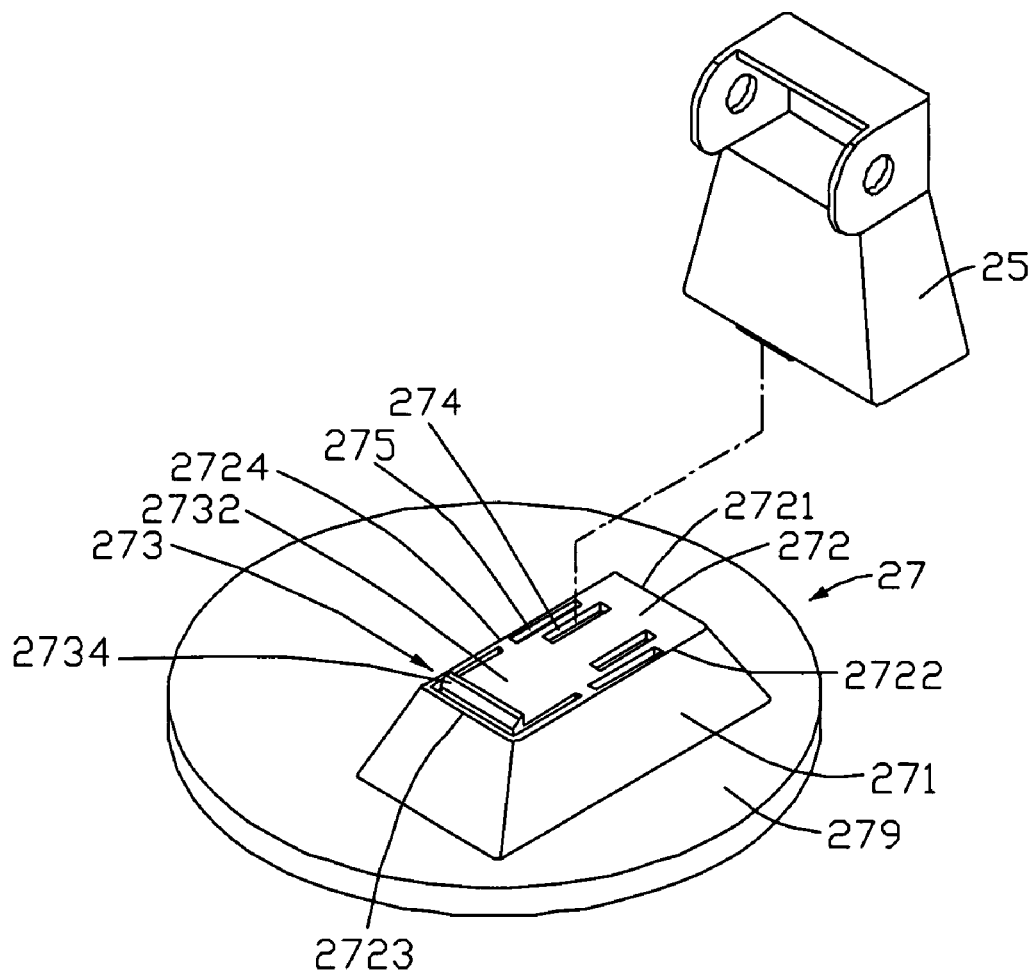
FIG. 2 is an exploded, perspective view of the base and the supporting member of the flat panel display of FIG. 1.

FIG. 2 is an exploded, perspective view of the base 27 and the supporting member 25. The base 27 includes a bottom plate 279, and a connecting portion 271 extending up from the bottom plate 279. The connecting portion 271 is in the shape of a hollow frustum of a rectangular pyramid, and includes a rectangular upper wall 272 parallel to the bottom plate 279.

The upper wall 272 includes a first short border 2721, a second short border 2723 parallel to the first short border 2721, a first long border 2722 perpendicular to the first short border 2721 and the second short border 2723, and a second long border 2724 parallel to the first long border 2722. The upper wall 272 further includes an elastic member 273, a pair of first through slots 274, and a pair of second through slots 275.

The elastic member 273 is disposed near the second short border 2723. The elastic member 273 includes a main body 2732, and a protrusion portion 2734 extending up from a free end of the main body 2732. The protrusion portion 2734 is near and parallel to the second short border 2723. Two opposite lateral sides of the main body 2732 are near and parallel to the first and second long borders 2722 and 2724, respectively.

The first and second through slots 274 and 275 are all disposed between the elastic member 273 and the first short border 2721. The second through slots 275 are parallel to each other, and disposed adjacent to the first and second long borders 2722 and 2724, respectively. The first through slots 274 are disposed generally between the pair of second through slots 275, and are parallel to the second through slots 275.

Figure 3:
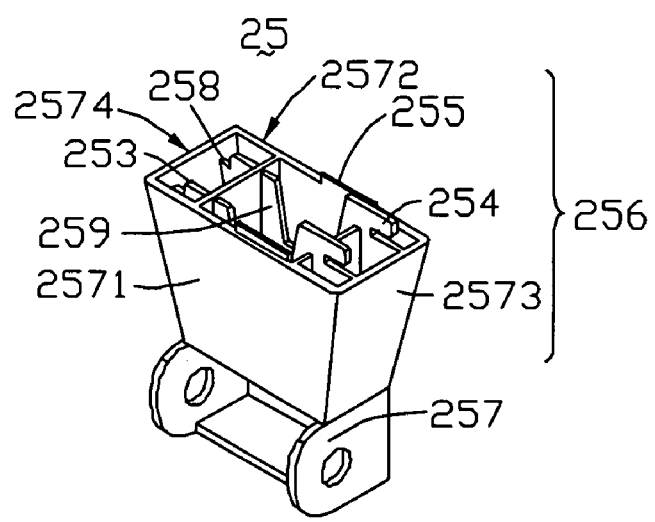
FIG. 3 is a bottom, perspective view of the supporting member of FIG. 2.

FIG 3 is a bottom, perspective view of the supporting member 25. The supporting member 25 includes a pair of knuckles 257, a front wall 2571, a back wall 2572, a right sidewall 2573, and a left sidewall 2574. The knuckles 257 are configured to receive the axle 227, so that the display module 22 is capable of rotating around the supporting member 25. The front wall 2571, the right sidewall 2573, the back wall 2572, and the left sidewall 2574 are all trapezoids, and cooperatively form a generally hollow frusto-pyramidal structure 256. The frusto-pyramidal structure 256 includes a pair of positioning protrusions 255 and a pair of supporting boards 259. The frusto-pyramidal structure 256 is for detachably attaching to the connecting portion 271 of the base 27. Thus an area of a bottom of the frusto-pyramidal structure 256 defined by the front wall 2571, the right sidewall 2573, the back wall 2572, and the left sidewall 2574 is substantially the same as an area of the upper wall 272 of the connecting portion 271.

One of the positioning protrusions 255 extends down from the front wall 2571, and the other positioning protrusion 255 extends down from the back wall 2572. The positioning protrusions 255 are parallel to each other, have the same size, and correspond to the second through slots 275.

The supporting boards 259 are vertically oriented and parallel to each other, and are located inside the frusto-pyramidal structure 256. The supporting boards 259 perpendicularly extend from the left sidewall 2574 to the right sidewall 2573, and thereby mechanically reinforce the frusto-pyramidal structure 256. Each supporting board 259 includes a bottom extending portion 253 disposed near the left sidewall 2574. Each extending portion 253, together with the left sidewall 2574, defines a positioning groove 258. The positioning grooves 258 are for receiving the protrusion portion 2734 of the elastic member 273. A portion of each supporting board 259 near the right sidewall 2573 protrudes down below said bottom of the frusto-pyramidal structure 256 and forms a hook 254. The hooks 254 correspond to the first through slots 274. Each of the hooks 254 is L-shaped, with an endmost portion of the hook 254 extending generally towards the right sidewall 2573. A length of a bottom side of each hook 254 is a little less than a length of each first through slot 274. A distance between the hooks 254 is the same as a distance between the first through slots 274.

Figure 4:
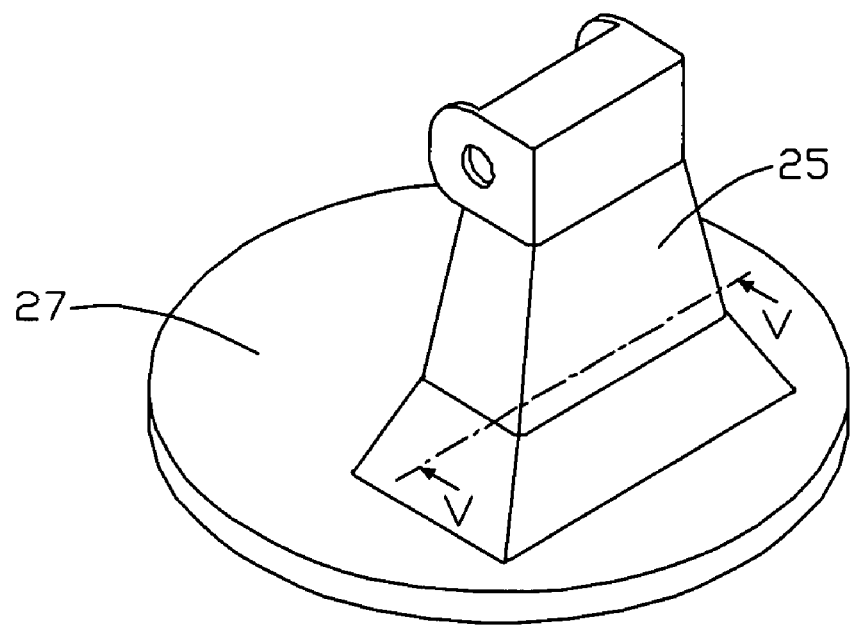
FIG. 4 is an assembled view of the base and the supporting member of FIG. 2.
Figure 5:
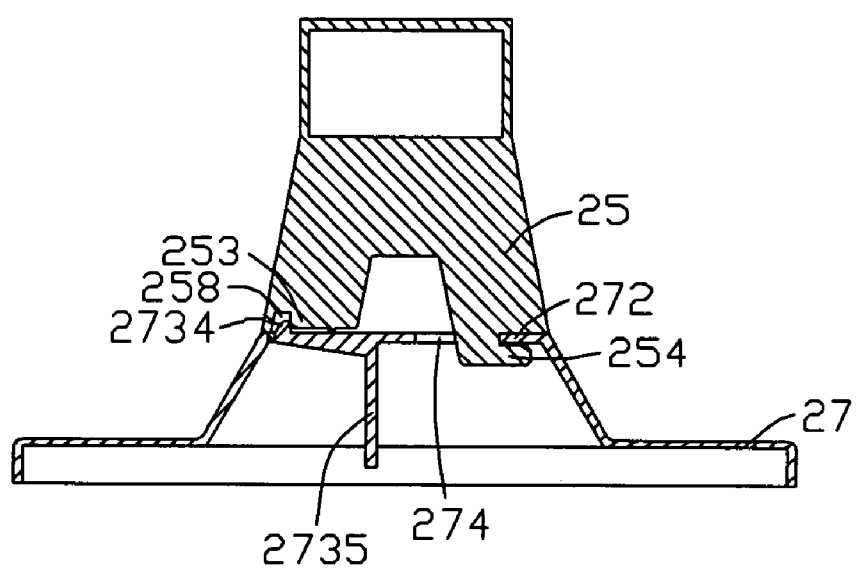
FIG. 5 is a cross-sectional view of the assembled base and supporting member taken along line V-V of FIG. 4.
Figure 6:
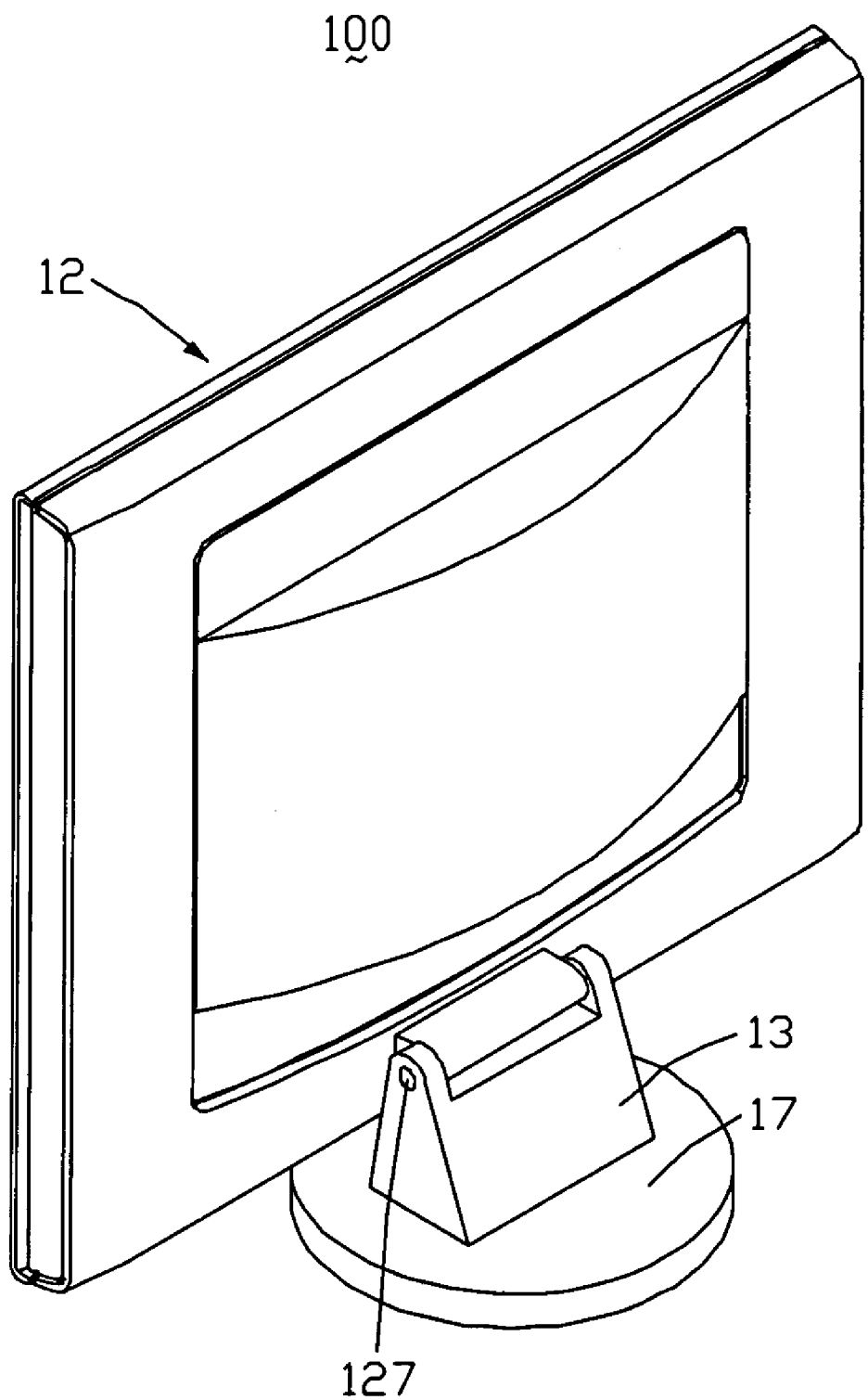
FIG. 6 is a rear, perspective view of a conventional flat panel display.

FIG. 4 is an assembled view of the base 27 and the supporting member 25. Referring also to FIG. 5, in assembly, first of all, the supporting member 25 is placed onto the connecting portion 271 of the base 27, so that the hooks 254 are disposed above the corresponding first through slots 274 of the upper wall 272, and the extending portions 253 of both supporting boards 259 are disposed above the protrusion portion 2734 of the elastic member 273. Secondly, the supporting member 25 is lowered down, so that the hooks 254 are inserted into the corresponding first through slots 274, and the positioning protrusions 255 are partly received in the corresponding second through slots 275. The protrusion portion 2734 is pressed down by the extending portions 253 of both supporting boards 259, which causes the main body 2732 of the elastic member 273 to elastically deform down. Thirdly, the supporting member 25 is moved towards the first short border 2721 of the upper wall 272 horizontally. Thus, the hooks 254 are fastened by the upper wall 272, and the positioning protrusions 255 are completely received in the second through slots 275. Simultaneously, the elastic member 273 rebounds to its original position, such that the protrusion portion 2734 is received in the positioning grooves 258.

Thus, the supporting member 25 is stably attached to the base 27. Because the hooks 254 are latched to the upper wall 272, the supporting member 25 is prevented from moving up and down. Because the positioning protrusions 255 are received in the second through slots 275, the supporting member 25 is prevented from moving forwards and backwards. Because the protrusion portion 2734 is received in the positioning grooves 258, and the hooks 254 are latched to the upper wall 272, the supporting member 25 is prevented from moving towards either lateral side. Further, the size and configuration of the frusto-pyramidal structure 256 are complementary to the size and configuration of the connecting portion 271. Therefore the assembled supporting member 25 and base 27 has a neat, aesthetically pleasing appearance.

In disassembly, firstly, the elastic member 273 is pulled down, so as to release the protrusion portion 2734 from the positioning grooves 258. The elastic member 273 can be pulled down by pressing a control tenon 2735 disposed inside the base 27 and connected to the elastic member 273 (see FIG. 5). Secondly, the supporting member 25 is moved towards the second short border 2723 horizontally to de-latch the hooks 254 from the upper wall 272. Finally, the supporting member 25 is pulled up away from the base 27. Thus, the supporting member 25 is conveniently manually detached from the base 27 without the need for any tools.

Advantageously, the base 27 can be stably attached to the supporting member 25 easily, and can be readily detached from the supporting member 25 whenever desired. When the base 27 is separate from the supporting member 25, the flat panel display 200 can be conveniently packed into a relatively small box or package. That is, the flat panel display 200 occupies less space during transportation, which can reduce the cost of shipment.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present invention to the full extent indicated by the broad general meaning of the terms in which the appended claims are expressed.

What is claimed is:

1. A flat panel display, comprising:
a display module;
a supporting member configured to support the display module, the supporting member comprising a first hook and a positioning groove; and
a base detachably attachable to the supporting member, the base comprising an upper wall, an elastic members, and a first through slot defined in the upper wall;
wherein when the first hook is latched in the first through slot by hooking the upper wall of the base and part of the elastic member is received in the positioning groove, the supporting member is detachably attached to the base, and the supporting member is prevented from moving along vertical directions by the first hook hooking the upper wall of the base.

2. The flat panel display as claimed in claim 1, wherein the elastic member cooperates with the supporting member at the positioning groove to prevent the supporting member from moving along horizontal directions.

3. The flat panel display as claimed in claim 2, wherein the elastic member comprises a main body and a protrusion portion extending from a free end of the main body, and the protrusion portion is received in the positioning groove.

4. The flat panel display as claimed in claim 1, wherein the supporting member further comprises a first wall, a second wall adjacent to the first wall, a third wall opposite to the first wall, and a fourth wall opposite to the second wall.

5. The flat panel display as claimed in claim 4, wherein the first wall, the second wall, the third wall, and the fourth wall cooperatively form a hollow frusto-pyramidal structure.

6. The flat panel display as claimed in claim 5, wherein the supporting member further comprises a first supporting board inside the hollow frusto-pyramidal structure, the first supporting board has a first extending portion, and the positioning groove is located between the first extending portion and the first wall.

7. The flat panel display as claimed in claim 6, wherein the first hook is L-shaped.

8. The flat panel display as claimed in claim 7, wherein the first hook is extends from the first supporting board.

9. The flat panel display as claimed in claim 8, wherein an endmost portion of the first hook extends generally toward the third wall of the supporting member.

10. The flat panel display as claimed in claim 8, wherein the supporting member further comprises a second supporting board inside the hollow frusto-pyramidal structure, the second supporting board is parallel to the first supporting board and has a second extending portion, and the positioning groove is located between the first and second extending portions and the first wall.

11. The flat panel display as claimed in claim 10, wherein the supporting member further comprises a second hook, the second hook extends from the second supporting board, and an endmost portion of the second hook extends generally toward the third wall of the supporting member.

12. The flat panel display as claimed in claim 11, wherein the base further comprises a second through slot parallel to the first through slot, and the second hook is latched in the second through slot.

13. The flat panel display as claimed in claim 4, wherein the supporting member further comprises a first positioning protrusion extending down from the second wall, and a second positioning protrusion extending down from the fourth wall.

14. The flat panel display as claimed in claim 13, wherein the base further comprises a pair of second through slots parallel to the first through slot, and the second through slots are configured for respectively receiving the first and second positioning protrusions.

15. The flat panel display as claimed in claim 1, wherein the base further comprises a bottom plate and a connecting portion extending up from the bottom plate, the connecting portion comprises the upper wall opposite to the bottom plate, and the upper wall comprises the elastic member.

16. The flat panel display as claimed in claim 15, wherein the connecting portion has a generally hollow frusto-pyramidal structure.

17. The flat panel display as claimed in claim 15, wherein the base further comprises an internal control tenon connected to the elastic member, and the internal control tenon is configured to be manually driven such that the internal control tenon releases the elastic member from the positioning groove when the supporting member is detached from the base.

18. A flat panel display, comprising:
a display module;
a supporting member configured to support the display module, the supporting member comprising a hook and a positioning groove; and
a base detachably fastenable to the supporting member, the base comprising an upper wall, an elastic member, and a through slot defined in the upper wall;
wherein the base is detachably fastened to the supporting member by cooperation of the hook being received in the through slot and hooking the upper wall of the base and thereby being detachably latched with the base and part of the elastic member being snappingly received in the positioning groove, and the supporting member is prevented from moving along vertical directions by the hook hooking the upper wall of the base.

19. A flat panel display, comprising:
a display module;
a supporting member configured to support the display module, the supporting member comprising a hook and a positioning groove, the supporting member having a hollow frusto-pyramidal structure and further comprising a supporting board inside the hollow frusto-pyramidal structure, the supporting board comprising an extending portion, the extending portion cooperating with a first wall of the hollow frusto-pyramidal structure to form the positioning groove; and
a base detachably attachable to the supporting member, the base comprising an upper wall, an elastic members, and a through slot defined in the upper wall;
wherein when the hook is latched in the though slot by hooking the upper wall of the base and part of the elastic member is received in the positioning groove, the supporting member is detachably attached to the base, and the supporting member is prevented from moving along vertical directions by the hook hooking the upper wall of the base.

20. The flat panel display as claimed in claim 19, wherein the hook is L-shaped, and an endmost portion of the hook extends generally toward a second wall of the hollow frusto-pyramidal structure which is opposite to the first wall.

* * * * *